US010731788B2

(12) United States Patent
Olsen

(10) Patent No.: US 10,731,788 B2
(45) Date of Patent: Aug. 4, 2020

(54) METHOD FOR ESTABLISHING A SIGNAL INDICATIVE OF THE PRESSURE-CONDITION IN THE AS CONTACT-SURFACE BEFITTED RUBBER-ELASTIC BODY OF A MACHINE FOOT, AS WELL AS MACHINE FOOT WITH HYDROSTATIC PRESSURE SENSOR

(71) Applicant: NGI A/S, Norresunby (DK)

(72) Inventor: Tomas Hecht Olsen, Klarup (DK)

(73) Assignee: NGI A/S (DK)

( * ) Notice: Subject to any disclaimer, the term of this patent is extended or adjusted under 35 U.S.C. 154(b) by 301 days.

(21) Appl. No.: 15/750,170

(22) PCT Filed: Jul. 20, 2016

(86) PCT No.: PCT/DK2016/050254
§ 371 (c)(1),
(2) Date: Feb. 2, 2018

(87) PCT Pub. No.: WO2017/020912
PCT Pub. Date: Feb. 9, 2017

(65) Prior Publication Data
US 2018/0231171 A1 Aug. 16, 2018

(30) Foreign Application Priority Data
Aug. 3, 2015 (DK) .................................. 2015 70500

(51) Int. Cl.
*F16M 7/00* (2006.01)
*G01L 1/14* (2006.01)

(52) U.S. Cl.
CPC .............. *F16M 7/00* (2013.01); *G01L 1/142* (2013.01); *F16F 2224/025* (2013.01); *F16F 2230/08* (2013.01); *Y10S 248/901* (2013.01)

(58) Field of Classification Search
CPC ........ F16M 7/00; G01L 1/142; Y10S 248/901
See application file for complete search history.

(56) References Cited

U.S. PATENT DOCUMENTS 4,644,805 A * 2/1987 Hafner ....................... G01L 1/26
73/862.68
4,846,436 A * 7/1989 Young ................... F16F 15/027
248/542

(Continued)

FOREIGN PATENT DOCUMENTS

CA 2287583 A1 * 4/2001 ............. G01G 21/23
CN 201859032 U 6/2011
(Continued)

OTHER PUBLICATIONS

Office Action dated Oct. 29, 2019 by the Chinese Patent Office for counterpart application No. 201680042228.4 (7 pages) and including English translation (8 pages), 15 pages total.
(Continued)

*Primary Examiner* — Nathaniel J Kolb
(74) *Attorney, Agent, or Firm* — Ware, Fressola, Maguire & Barber LLP

(57) ABSTRACT

The invention relates to a method for the establishment of a signal which is indicative of the pressure-condition of a machine foot (1), as a fixed surface of a rubber-elastic body (5), where a load of the machine foot (1) is transferred from a cap (4) to a substrate (31) through the rubber-elastic body (5), which is pressurised by the increasing load, such that the distance between a free upper surface part (5.1) of the rubber-elastic body (5) and an immobile part (14.1) is determined by an electro-mechanical transducer (6) establishing an electrical signal corresponding to the distance which is used as the measurement for the rubber-elastic body's pressure-condition and thus the machine foot's load.

8 Claims, 8 Drawing Sheets

(56) References Cited

U.S. PATENT DOCUMENTS

| | | | | |
|---|---|---|---|---|
| 5,801,339 | A * | 9/1998 | Boult | G01G 17/08 |
| | | | | 177/261 |
| 5,881,533 | A * | 3/1999 | Focke | F16M 7/00 |
| | | | | 248/542 |
| 10,308,487 | B2 * | 6/2019 | Ost | B66C 23/905 |
| 2016/0340156 | A1 * | 11/2016 | Ost | B66C 23/80 |
| 2017/0114943 | A1 * | 4/2017 | Olsen | F16M 7/00 |

FOREIGN PATENT DOCUMENTS

| | | |
|---|---|---|
| CN | 202469386 | 10/2012 |
| DE | 10 2007 025 382 | 12/2008 |
| EP | 0 302 437 | 2/1989 |
| EP | 0 801 259 | 10/1997 |
| EP | 1 953 291 | 8/2008 |
| JP | 58-77126 | 5/1983 |
| WO | 2015197065 | 12/2015 |

OTHER PUBLICATIONS

Machine Translation of CN 201859032 Description (4 pages) and Claims (2 pages), 6 pages total.

* cited by examiner

METHOD FOR ESTABLISHING A SIGNAL INDICATIVE OF THE PRESSURE-CONDITION IN THE AS CONTACT-SURFACE BEFITTED RUBBER-ELASTIC BODY OF A MACHINE FOOT, AS WELL AS MACHINE FOOT WITH HYDROSTATIC PRESSURE SENSOR

CROSS-REFERENCE TO RELATED APPLICATIONS

This application is a U.S. national stage of International Appl. No. PCT/DK2016/050254 filed 20 Jul. 2016, which claimed priority to Danish Appl. No. PA 2015 70500 filed 3 Aug. 2015, which application is incorporated herein by reference in their entireties.

TECHNICAL FIELD

The method involves the load of a machine foot being transferred from a rigid cap to a substrate through the rubber-elastic body, the pressure of which is set with the increasing pressure load. A free surface part of the rubber-elastic body will thus move in relation to an immovable part, such as the rigid cap. The new and special aspect of the invention consists of the movement being determined by an electro-mechanical transducer establishing an electrical signal corresponding to the distance. This signal is used as the target for the rubber-elastic body pressure-condition and thus the machine foot's load.

BACKGROUND

According to WO 2015/197065, a simple pressure-sensitive load cell is used in a machine foot between the loaded part and a rubber-elastic gasket surface resting against the substrate. Possible movement of the rubber-elastic body under the pressure-condition due to the load is not determined by this known method for load measurement. The new and special aspect of the invention lies in the fact that a measurement is taken of the hydrostatic pressure in the rubber-elastic body, which can then be used to determine the machine foot's load.

In U.S. Pat. No. 4,644,805 an elastomeric material is arranged between two plates, and is further secured or bonded at the opposing surfaces of the plates, and further a force measuring device such as a piezoelectric pressure transducer is provided within the elastomeric material.

According to CN202469386 a piezoelectric transducer is provided in a machine support, such as a lathe support whereby the measured force on the support may be displayed on an accompanying LCD display.

It is thus known that using load cells can be built into a machine foot. This solution, however, is relatively expensive and also very precise, which is not always necessary. Accordingly, a service is being paid for which is not actually required. The load cell contains a strain-gauge embedded in a steel structure and is not a cheap mass-produced product made by the billion.

From U.S. Pat. No. 5,881,533, a machine foot comprising a load cell is also known.

The machine foot in that document is, however, not suitable to be used in areas where high hygienic requirements apply, among other reasons, due to its complex structure with many visible and exposed components. The machine foot is also specially designed to be mounted on packaging machines for cigarettes.

SUMMARY OF THE INVENTION

It is therefore the objective of the present invention to provide a machine foot which does not have the above disadvantages or which at least provides a useful alternative to the known technology. Note that the term "machine foot" is sometimes replaced by the designation "machine shoe" in the literature, but these are just different names for the same component.

It is preferred that the distance between the free surface part of the rubber-elastic body and the immobile part is determined by a measurement of the distance-related electrical capacity between a first plate with the rubber-elastic body's free surface part and another plate with the immobile part. Such a capacitive determination of a distance is well known and can give an accurate measure of even small changes in the distance, and the integrated components in such a transducer are extremely simple and very reliable.

It is also preferable that the space between the first plate and the other plate is filled by a dielectric element. It is clear that the dielectric material must be soft and flexible, so that it does not in itself block the movement of the two plates towards and away from each other during the loading of the machine foot.

Further, it is preferable that the immobile part during measurement is maintained in a tubular sleeve at a predetermined distance from the tubular end part of the sleeve adjoining the free surface part of the rubber-elastic body. Such a sleeve can easily be brought into position and maintained at a predetermined distance from a free surface part of the rubber-elastic body. The free surface part can turn any way in relation to the direction of the load on the machine foot, and only the sleeve is mounted in such a way that it does not move significantly when the machine foot is loaded.

For convenience, prior to loading of the machine foot, the immobile part will be calibrated by a stopper from the outside being adjusted by a threaded gear with an enveloping pipe fitting, provided outside of the stopper of the tubular sleeve, directly or indirectly. This will move the immobile part towards or away from the free surface part of the rubber-elastic body for the establishment of a selected distance between the rubber-elastic body's free surface and its immobile part. It will be sensible to let the stopper rest against the tubular sleeve and press it more or less firmly in the direction of the free surface, to ensure that there is not an undefined gap between the immobile part and the free surface. In addition, or as a substitute for a calibration achieved by relying on an outside prop, an electronic calibration option can be provided. Here, the machine foot is exposed to a known load of a given size, and a readout is taken of the measured value for the distance. This is repeated for a number of well-known loads, enabling a calibration curve to be determined. This can happen in connection with the machine foot's production and/or it can be done by the end user. In either case, the calibration curve obtained from loading will be read into the permanent memory of the electronic unit.

As the electronic unit contains a radio transmitter, and as the machine foot is also expected to be transported by aeroplane, it must be possible to switch off the radio transmitter. This can be done wirelessly, or it can be done using a switch. The switch can be a physical switch on a surface part of the mechanical foot, or it can be a virtual switch that is controlled from outside by knock signals.

The invention also relates to a machine foot comprising an adjustable spacer, which is designed to be coupled to a machine at one end and coupled to a load distributor at the other end. This load distributor includes a load-bearing cap that receives the entire load from the spacer in a central area on the upper side, which is then arranged to transfer the load through its entire underside to a rubber-elastic body that is designed to transfer the load to a substrate. The special aspect of the invention consists of an electro-mechanical transducer which is embedded in the rubber-elastic body and designed to provide an electrical signal for indication of the hydrostatic pressure-condition in it. The sensor is not influenced directly by the force which the machine foot transfers to the substrate, but is influenced solely by the internal excess pressure in the rubber-elastic body's material.

This excess pressure works in any direction, and the sensor can therefore be arranged regardless of which direction the machine foot is loaded in.

In a method of the mechanical part of the electro-mechanical transducer, it is designed to translate a given internal overpressure in the rubber-elastic body to a corresponding motion between a free surface of the rubber-elastic body and an immobile part, where the immobile part is provided on the inside in a tubular sleeve and where the electrical part of the transducer is designed to deliver an electrical signal corresponding to the distance between the free surface of the rubber-elastic body and the immobile part. This provides a very useful arrangement of the electromechanical transducer, which can therefore be installed anywhere between an immobile part of the structure and an internal party of the rubber-elastic body, as the tubular sleeve is kept appropriately motionless during measurement and its end part receives the movement of the free surface part.

It is appropriate that the tubular sleeve is positioned in such a way that it has an end part bordering the rubber-elastic body, and where the rubber-elastic body's free surface faces the tubular sleeve's open end part, and the tubular sleeve's other end part is accessible from the outside, since the tubular sleeve is either mounted in an opening in the cap or is placed by the rubber-elastic body's order with a substrate. This ensures that the electro-mechanical transducer in the tubular body can be accessed from the outside so that it can be replaced and serviced.

In addition to the immobile surface, the tubular sleeve contains the following elements at a minimum: a battery, an electronic calculation device, an antenna and a device adapted for radio communication to/from the surroundings. This ensures that the recorded signal can be stored in the device and transmitted to the surroundings.

For convenience, a removable stopper can be mounted on the tubular body away from the rubber-elastic body's facing part where the stopper is mounted by an either exterior or interior threaded pipe fitting, which encloses it in a tubular body. The stopper can thus be used to directly push the tubular casing more or less forcefully forwards against the four surfaces, in order to ensure calibration of the transducer prior to actual measurements.

The invention concerns a levelling unit that also functions as machine foot and which includes a top part for sealing in an block such as a machine as well as an under part for contact with a foundation such as a floor, and where the under part includes a cap which is at least partly enclosing a sealing body. This contains a sensor device which is placed in a cavity in the sealing body.

The invention also concerns simultaneous use of multiple levelling aggregates.

When a machine has more than 3 machine feet, one or more machine feet will most often be loaded differently. This may be due to the machine simply being heavier at one end than the other, but it can also be due to the machine foot not being adjusted properly. The machine can thus be levelled to the horizontal, while the actual machine foot has an uneven load. By knowing the load, for example, as a percentage, it is easier to adjust the feet in such a way that the load will be more evenly distributed. The load can possibly be translated into kg, but that is not necessary to distribute the pressure.

Correct adjustment of the machine feet can mean that:
1. The machine becomes very stable
2. No feet will be overloaded
3. No spindles will buckle
4. The machine's design will not be distorted This is achieved with a levelling block of the kind specified in the preamble, and in which the sensing device also includes a pressure sensor with a voltage field electrically connected to a battery, and where the pressure sensor is electrically connected to a printed circuit which is designed to convert an electrical input signal to a wireless output signal, and where an antenna sends the wireless output signal to a levelling unit located outside the receiving device.

When the machine mounted on the machine foot is subject to a weight, the pressure will be transferred to the machine foot by the top part being pressed downwards. This pressure is transferred through the cap of the lower part or distributor cap to the sensing device: the pressure sensor, since the pressure force transferred from the cap will affect the mounting body/the sealing body directly and ensure that the force is transferred to the sensor unit.

The pressure causes the electrical voltage obtained in the pressure sensor connected to a battery to change. This changed electrical voltage is recorded and converted to a digital signal, which is sent via the circuit to a methodor. This circuit or methodor converts the electrical input signal to a wireless signal, which is output via a connected antenna sent out to a recipient located outside the machine foot/levelling block. At least part of the methodor acts as the radio transmitter.

For convenience, a capacitive pressure sensor can be selected. The signal can be sent via Bluetooth or similar protocols.

Some of the advantages of the system are that it:
Is cheap
Is wireless
Strengthens service and maintenance.
Offers security for proper configuration of the machine
The system can perform both vibration and pressure recording.

Some of the benefits of pressure measurement are that
The machine becomes very stable
No feet are overloaded
No spindles buckle
The machine's design is not distorted As mentioned, the pressure gauge/sensor device which is the subject of the invention is also able to detect vibrations. Some of the advantages of being able to do this are that it:
Reduces unnecessary production stops, which achieves savings
Anticipates serious operational problems
Assesses the conditions of the machines that are critical to the method
Displays defects as soon as they occur Makes it possible to predict the remaining service life of the device The signal with the machine foot's load data can be sent to a mobile phone via a simple app, which in turn will be able to distribute the load from a given machine correctly to a larger or smaller number of machine feet with the associated levelling block.

The invention thus records pressure in the sealing material, i.e. the rubber-elastic body, preferably produced in a suitable rubber material. This makes it compact, wireless and inexpensive. The pressure can also be measured in encapsulated liquid or air that transfers the pressure from the spindle.

If a capacitive pressure sensor is selected, it is noted that a capacity component is a component with the ability to store an amount of energy. By taking a set of parallel plates and connecting them to a potential difference in voltage, the electrons will move from one plate to the other until reaching a state of equilibrium, and the load will be held between the two parallel plates. The amount of charge that can be stored (capacity) depends on the area between the plates, the distance between the plates and the dielectric constant between the plates. Capacitive sensors can be built from a variety of materials, and there is no need for a careful determination, such as a strain-gauge requires. The manufacturing method is also simpler and the sensor can easily be manufactured more cheaply than equivalent resistive load cells.

In addition, in such a sensor element, additional sensors can be introduced to determine other parameters, such as temperature and acceleration.

Temperature measurements can be used as needed for ventilation information, cleaning information etc., and acceleration can provide important information about a machine foot's vibration level.

The invention can be used for a pressure equalisation of differently loaded machine feet, as each machine foot in a complex has a pressure sensor mounted as indicated. The force of each machine foot and, consequently, its load are sent to the recipient and compared here. If there are unacceptable differences, pressure equalisation will take so that each machine foot carries the same weight.

The pressure sensor is thus appropriate for a wireless device that communicates with the surrounding area via radio or other wireless signals.

The pressure sensor is encased in a sealing material mainly manufactured in a polymer material such as a rubber body. Pressure can also be transferred via a fluid or a gas/air.

A printed circuit, also referred to as a circuit board, (also called printed circuit boards or in technical terminology "print"), is used in electronics to realise electronic circuits in a compact and robust form. Often, the abbreviation PCB (Printed Circuit Board) is used.

A printed circuit board consists of a plate of an electrically insulating material, where one or both side surfaces (and possibly also inside the material) features tracks of metal with good electrical conductivity, typically copper.

The metal tracks serve as the electrical wiring that connects a number of electronic components which are mounted on one or both sides of the plate and thereby form the desired electronic circuits. The antenna is in contact with the printed circuit board and can, if necessary, be embedded in it or provided as a special metal track on the printed circuit board.

The pressure cell is thus wirelessly connected and communicating with an element/receiver unit located outside the levelling block.

For further convenience, the pressure sensor comprises a capacitive pressure sensor, on which at least one first flat plate and another flat plate are placed parallel to each other, where the second plate is situated at a distance T from the first plate, and a dielectric is placed between the two plates.

The number of plates can be more than two. The structure indicated is a simple and affordable way to provide a capacitive pressure sensor.

When the distance between the plates is changed, it is converted to an output signal that displays the percentage pressure or the real pressure for the relevant levelling block or machine foot. In addition, the PCB can be equipped with sensors for measuring other parameters: temperature, acceleration or vibration. These parameters are translated into measurement data, which, together with the pressure, can be sent to a central methoding unit, which will then be able to monitor the machine foot, and thus also to a certain extent monitor the part of the machine which the machine foot supports.

For further convenience, the selected dielectric is an elastic material such as rubber or elastic silicon. The material's elastic properties are chosen from the measurement area that you want to operate within. The hardness of the selected dielectric is different to the hardness of the first and second plates.

For further convenience, the first plate is preferably the lower plate with a wired connection to the battery, and the voltage between the two plates is set to be changed when the maximum distance of the plates increases or decreases.

When the body is compressed or the pressure sealing set due to a load with resulting pressure on the top part, the pressure will be transferred to the flat top plate on the sensing device. This will be pressed down and get closer to the underlying plate, giving rise to voltage changes, which in turn give rise to a signal. When the pressure is removed, this will again give rise to voltage changes, because the two plates will now move away from each other. This also gives rise to an electric signal.

For further convenience, the sensing device is located in a cavity in the sealing material, and the sealing material, or a transfer sealing medium, is in contact with the entire upper surface of the capacitive pressure sensor.

Essentially, uniform pressure is put on the sensor unit from the elastic compressible sealing material. The sealing material can be more or less compressible, but that does not affect the basic functionality of the pressure sensor. Instead of the sealing material having direct contact with the sensing device, a transfer medium such as another elastic and compressible material can form the installation.

For further convenience, the cavity can be closed against the foundation with a prop.

It is important that the sensor unit is protected against dirt and no water/moisture can penetrate into the device.

For further convenience, the cap is made of a rigid material such as steel, and the top part is designed to transmit a force sustained by the top part directly to the cap, whose internal surface is facing the sealing material, which in essence is congruent with its outer surface and in direct contact with it.

By selecting the materials and design as specified, it can be ensured that the force that is applied to the top part will be transferred to the sensor unit in such a way that it can detect the pressure in the machine foot.

For further convenience, the cavity is a cylindrical space whose radial pointing walls include a thread, and the sensing device is placed in a circular housing.

This is a simple way of getting the overall sensor device's various components in a combined unit that can be effortlessly inserted into the cavity in the engine foot's sealing material. The circular sleeve is manufactured in a plastic material, which does not interfere with the wireless signal.

For further convenience, the sensing device comprises the pressure sensor, the battery, the printed circuits and the antenna, and these components are positioned in such a way that the pressure sensor is located closest to the top part, the battery is located under it in electrical wiring contact with it and the printed circuit board is located under and in electrical wiring contact with pressure sensor.

The printed circuit is preferably located under the battery and in contact with the second plate, i.e. the bottom plate, and the antenna is located closest to the foundation in such a way that it can send signals under the steel cap both directly and by reflection from the floor.

The specified design results in a very compact device which physically takes up little space.

For further convenience, the invention comprises the use of more levelling aggregates according to that stated above and below in a machine which has a given number of levelling aggregates and where each levelling unit sends information wirelessly to a receiver unit comprising information on what the pressure, temperature and/or acceleration in each levelling block is, either in terms of pressure recording as a percentage in relation to the total weight or in a weight unit and/or in a temperature unit and/or in a unit of acceleration, and in which the receiving device is designed to calculate the necessary adjustment of each levelling block, and comprising a pressure relief in the case of the pressure change that must take place for the achievement of a uniform load on the levelling aggregates.

The weight can thus be expressed in grams or kilos, temperature in degrees Celsius and the acceleration in $m/s^2$.

By a further aspect of the invention, the machine foot contrives that all gaskets in the engine foot consist of FDA-approved silicon and the foot consists of FDA-approved NBR rubber material. The entire design is USDA and 3A approved and designed according to EHEDG guidelines.

By a further aspect of the invention, the machine foot is designed so that the sealing material is a polymer material such as a rubber attached to the cap by vulcanisation.

This results in optimal adhesion of polymer materials to the cap, as the adhesion reduces the ingress of dirt and bacteria in the machine foot through the bottom of it.

The invention also concerns the application of the above machine foot in locations with high hygiene requirements, such as locations for food methoding or manufacture of medicinal products.

BRIEF DESCRIPTION OF THE DRAWINGS

The invention must then be further explained with reference to the drawing, where.

DETAILED DESCRIPTION OF THE INVENTION

Figure 1:
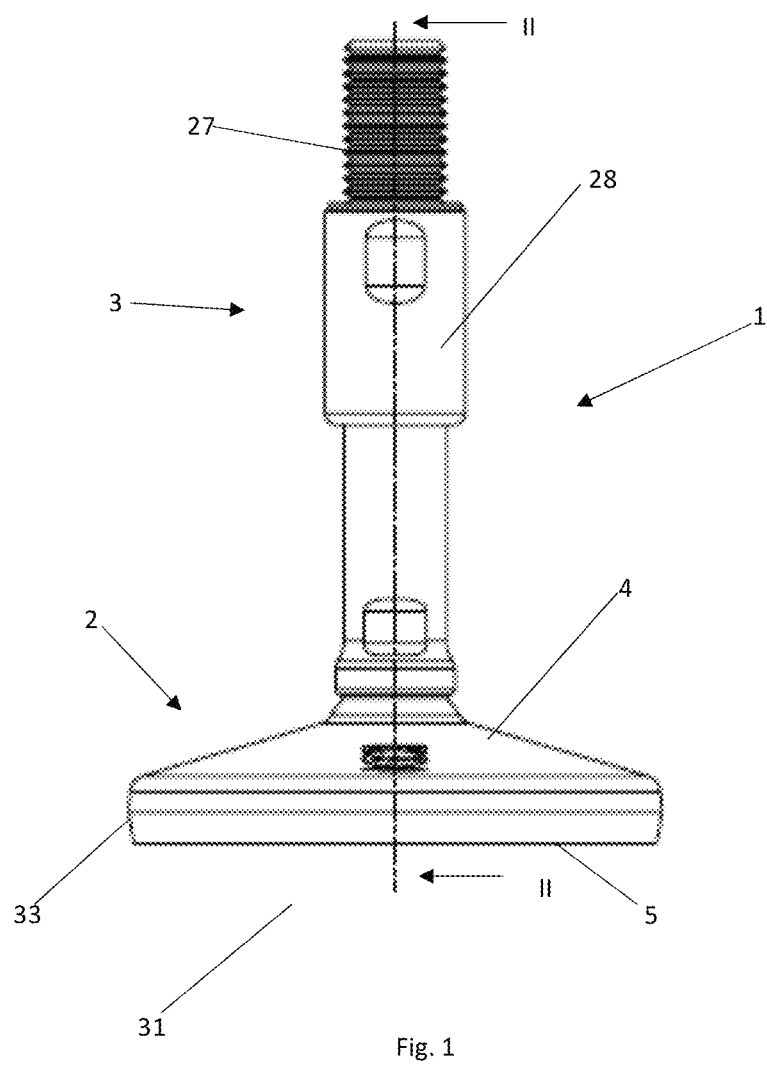
FIG. 1 shows a levelling block in the form of a machine foot according to the invention comprising a top part as well as an under part
Figure 2:
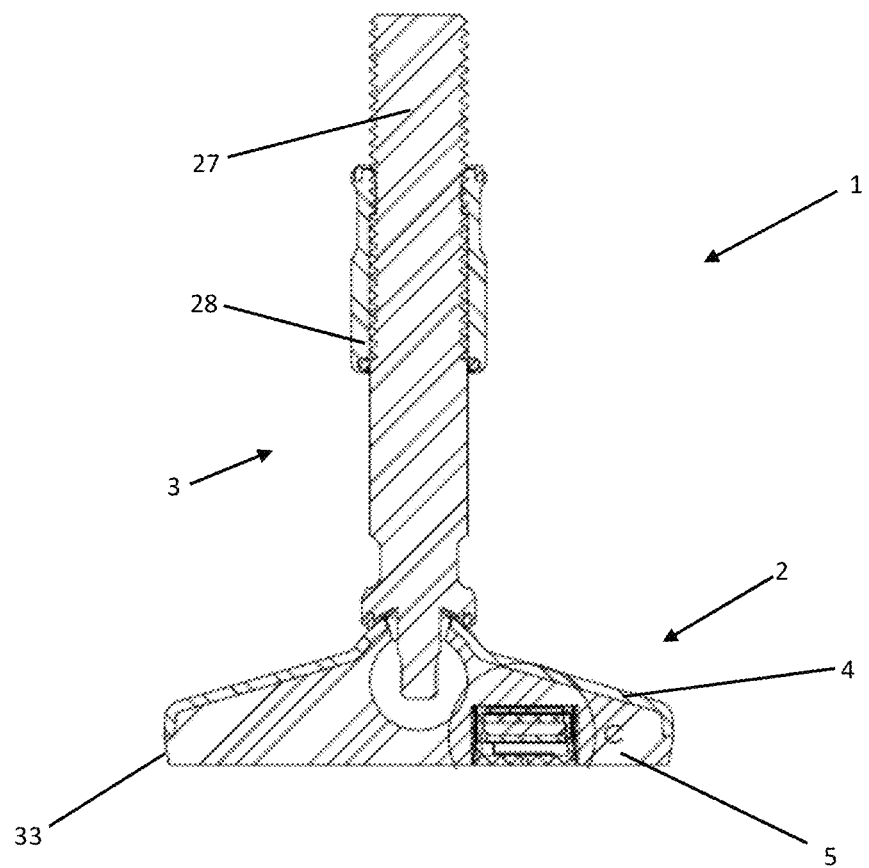
FIG. 2 shows a profile image of the machine foot shown in FIG. 1 along the line II-II.

With reference to FIGS. 1 and 2, levelling block 1 according to the invention will be reviewed.

Levelling block 1 comprises machine feet. The sensor unit can be used in levelling blocks as well as in machine feet that do not have built-in blocks to ensure correct levelling.

FIGS. 1-5 show the levelling block/machine foot 1 comprising a top part 3 for sealing in an aggregate such as a machine, as well as an under part 2 for contact with a foundation 31, such as a floor, such that the under part 2 includes a cap 4, and a mainly annular sealing material 5 which is housed in the cap 4 and partially enclosed in it. The top part 3, also referred to as the "spacer" since it creates distance between the machine and under part 3, a distance that can be adjustable, as explained below. Sealing material 5 is made from a rubber-elastic material and also referred to as "the rubber-elastic body". The rubber-elastic body 5 or the sealing material 5 is usually vulcanised directly together with the cap 4, but it can also be cast separately and subsequently glued to the lower side of the cap. Sealing material 5 partially encloses sensor unit 6. The foundation 31 is the substrate which the machine foot rests on and which carries the machine. The top part 3 includes in the example shown a spindle 27 and a threaded guard 28. The top part can also be constructed by other means and, for example, include a hydraulic device instead of a spindle 27.

Figure 3:
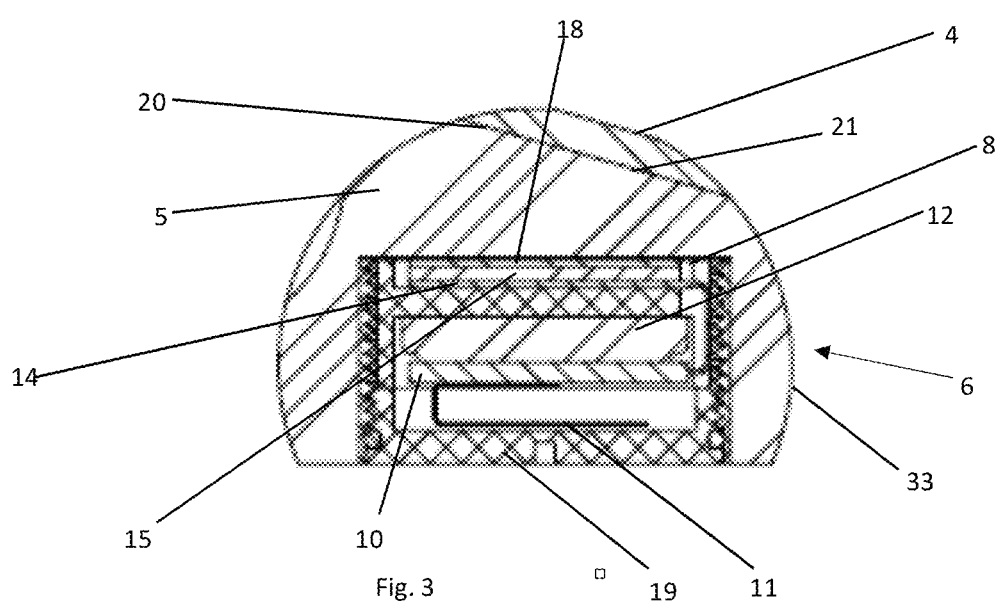
FIG. 3 shows a section of FIG. 2 encircled with reference C.

FIG. 3 shows a section of FIG. 2 that is encircled with reference C and includes sensor unit 6, which is partially embedded in sealing material 5, since the sensor 6 towards the bottom of the levelling unit is not identified by the sealing material, but by a stopper 19 as explained below.

Figure 6:
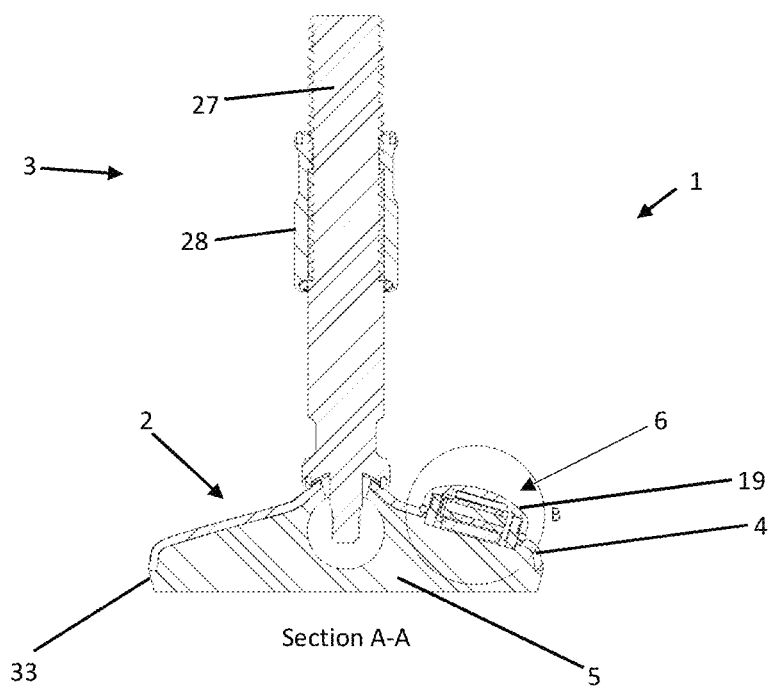
FIG. 6 shows a section through a machine foot with a sensor unit in an alternative location.
Figure 7:
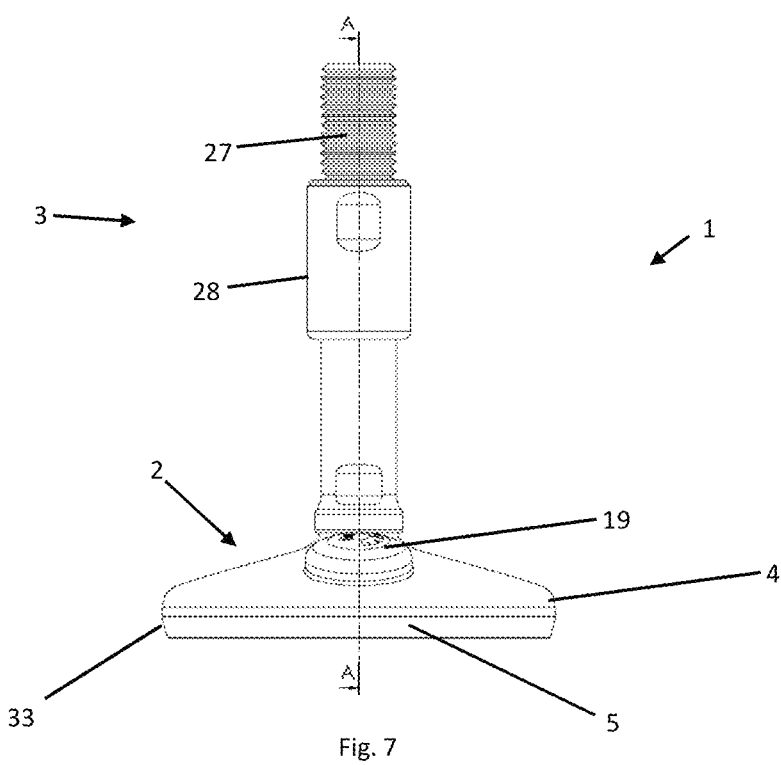
FIG. 7 shows the sensor unit in FIG. 6 in a side image.
Figure 8:
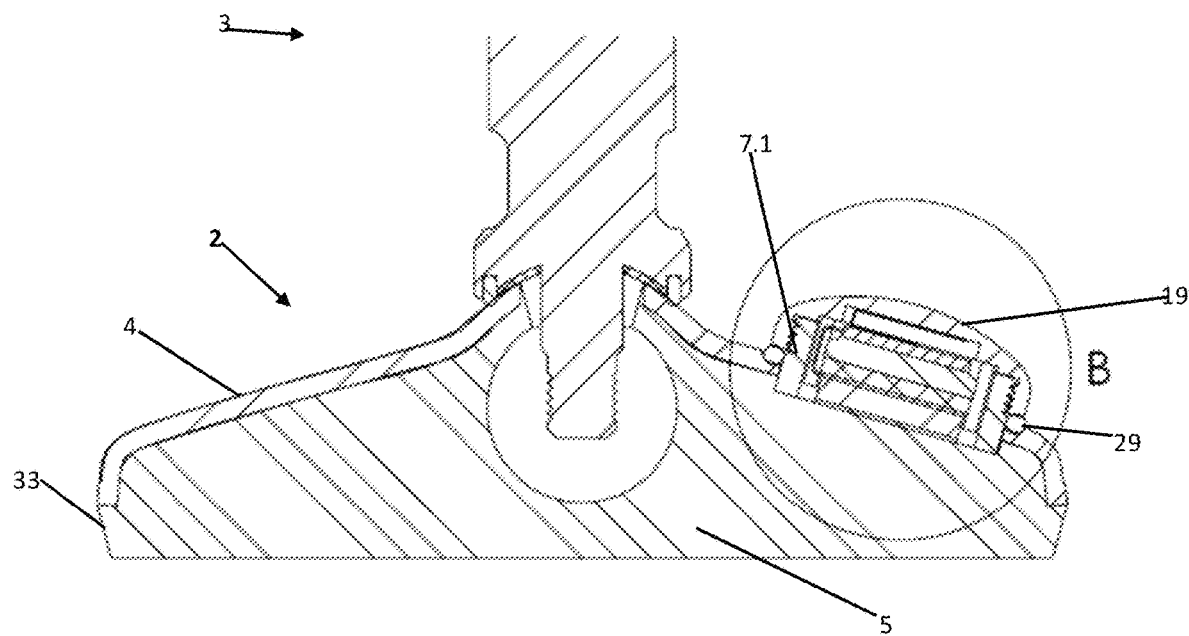
FIG. 8 shows the sensor unit from FIG. 6 in an enlarged version.

The upper surface 18 of the sensor unit 6 is covered by and in contact with sealing material 5, which is an elastic mass, typically a rubber mass. The sealing material 5 has an outer and upper limiting surface 21, which is in contact with the internal surface 20 of the cap 4. When the top part 3 is loaded for example on a mounted machine, the pressure is transferred to the cap 4, which, due to its location against the rubber mass 5, transfers the pressure to it. As seen in FIG. 6 and FIG. 7, the cap 4 receives the pressure or load from the top part 3 on a restricted central area. Since the cap 4, however, is made of stiff material compared to the rubber mass, the cap 4 is only slightly deformed by the pressure load from the machine's weight and vibration. The rubber-elastic body 5 transfers the pressure inflicted to the floor 31 via its adhesive surface with it and will thus be exposed to a certain internal hydrostatic pressure. Between the cap and the floor, the rubber-elastic body has an exposed area 33, where the material 5 is not in contact with either the floor 31 or the cap 4, and here the pressure load will cause the rubber mass to move outwards until the tensile stresses in a surface layer of the rubber mass 5 balance the internal excess pressure. Measurement of this surface movement in the direction away from the centre line can give an indication of the pressure-condition in the rubber mass 5 under load, but it is not easy to get a sure point of reference for such a measurement at this place, and screening of a measuring transducer is also not easy here.

The rubber mass will then, however, press against the upper flat surface 18 of the sensor unit 6. This is due to the fact that the bottom of the cavity 7 consists of an upper surface part of the rubber-elastic body 5, which in the same way as area 33 is free and not subject to load. Between the rubber mass 5 and the upper flat surface 18 of the sensor unit 6, another pressure-transfer medium such as liquid or gas may be housed. It should be noted that the sensor unit's upper flat surface 18 hereby receives movement caused by the internal excess pressure in the rubber mass and thereafter it is the size of this movement that is to be specified.

However, it should be mentioned that it is also possible to measure the pressure directly with a pressure sensitive element, such as a piezoelastic element. This type of element only moves an infinitesimal distance when exposed to push/pull, and creates a weak electric voltage difference between two sides, where the voltage difference is a good measure of how much pressure the element is exposed to.

Figure 4:
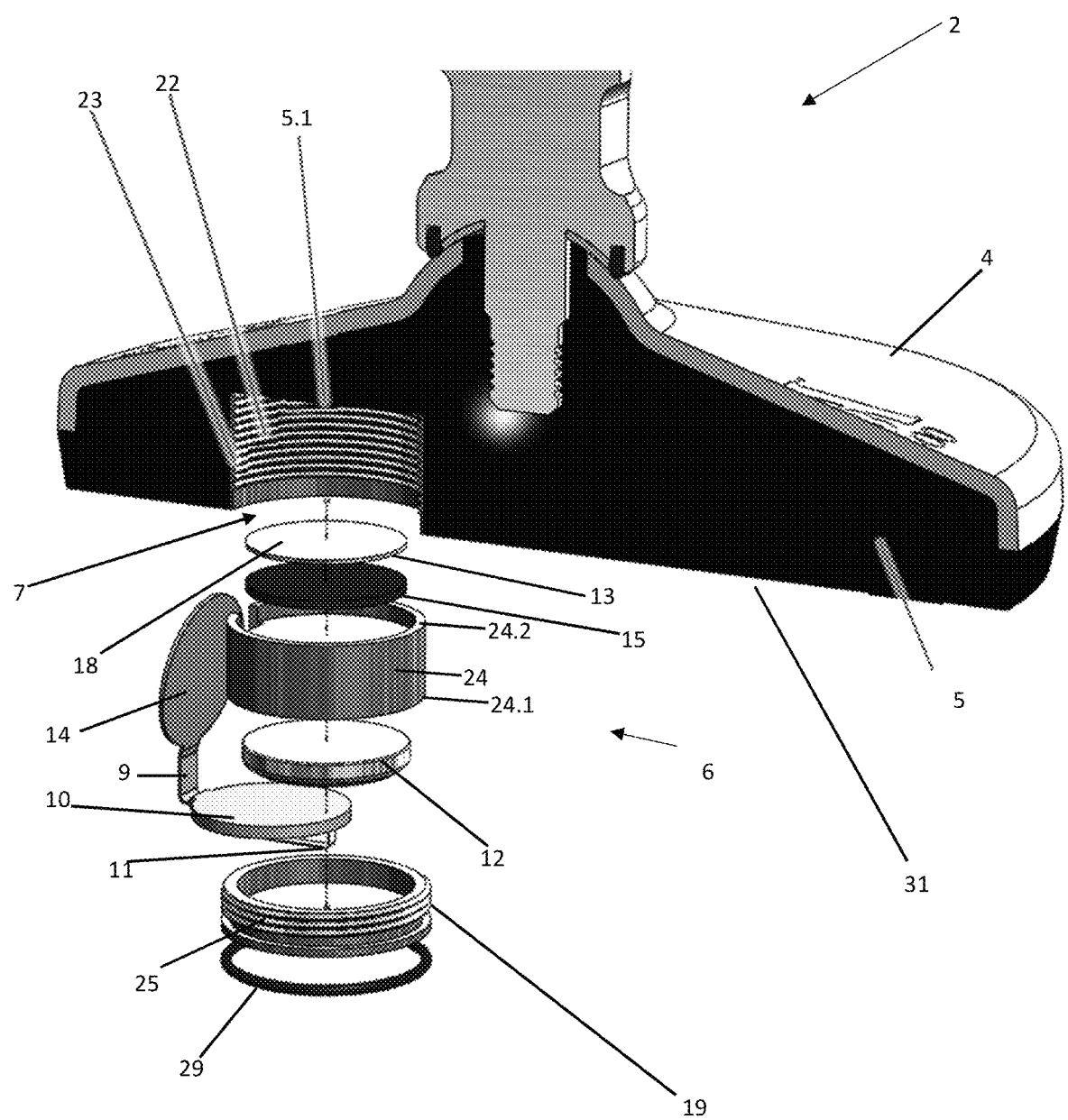
FIG. 4 shows the under part of a machine foot according to the invention, where a sensor unit is taken out of a cavity in the machine foot and shown in exploded drawing.
Figure 5:
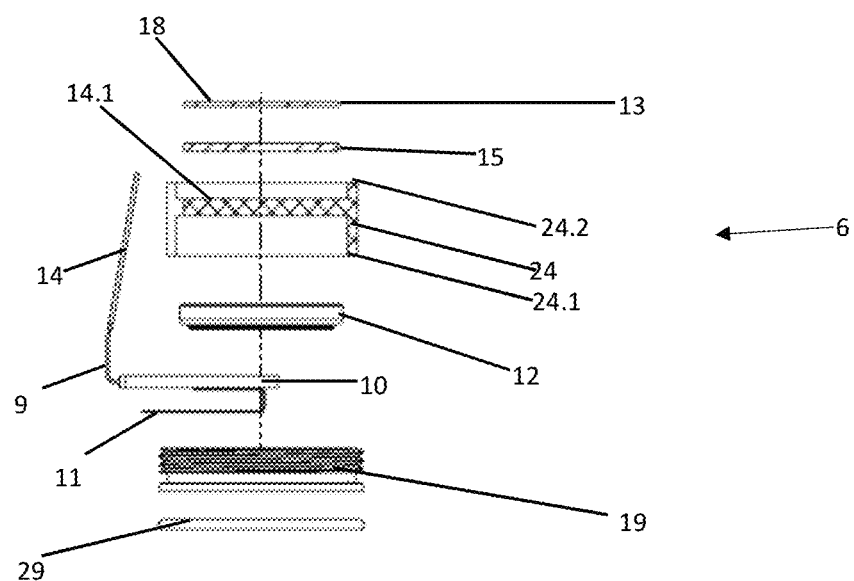
FIG. 5 shows a sensor unit in the exploded drawing.

The sensor unit 6 will now be explained with reference to FIG. 4 and FIG. 5, such that FIG. 4 shows under part 2 of a levelling device 1 according to the invention, and a sensor unit 6 is taken out of a cavity 7 in the machine foot and shown in a perspective-based exploded drawing. FIG. 5 shows the sensor unit 6 flat in the exploded drawing.

The under part 2 includes the cap 4 which at least partly encloses the elastic sealing material 5. In the sealing material 5, the sensor unit 6 is placed in a cavity 7. The sensor unit 6 includes a pressure sensor, in this case a capacitive pressure sensor 8 (shown jointly in FIG. 3 with the dielectric 15 and the two plates 13 and 14) with a voltage field, in electrical connection 9 with a battery 12 and in electrical connection with a printed circuit board 10. The printed circuit board 10 is designed to transform an electrical input signal into a wireless output signal, and thus include a transmitter of wireless signals, such as a radio transmitter or a transmitter of infrared signals. An antenna 11 is thus shown in connection with the printed circuit board 10 and from there the wireless output signal is sent to a receiver device located outside levelling block 1, for example in the form of a mobile phone or a computer. The signal can be sent via a Bluetooth protocol or via another industrial standard for wireless communication between electronic devices.

The pressure sensor can also take other forms, as long as it is constructed so that it gives a measurement of the hydrostatic pressure in the rubber-elastic body that carries the machine foot's load.

The sensor unit 6 thus includes the capacitive pressure sensor 8, the battery 12, the printed circuit board 10 and the antenna 11. In the example of the invention given in FIGS. 3 and 4, the components are placed in such a way that the capacitive pressure sensor 8 located closest to the top part 3 and the battery 12 are located under and in electrical wiring contact with it, such that the printed circuit board 10 is located under the battery 12 and in electrical wiring contact with the capacitive pressure sensor 8. The antenna 11 is located closest to the foundation 31. The location can, of course, be different, but this structure makes it easy to place the sensor unit 6 in the sealing material 5 of a mechanical foot 1 and when the antenna 11 is closest to the foundation 31 its signals will not be amplified by the cap 4.

The capacitive pressure sensor 8 comprises a first flat plate 13 and another flat plate 14, which are placed parallel to each other. The second plate 14 is located at a distance T from the first plate 13 and under this, and a dielectric 15 in the form of an elastic material such as silicon is placed between the two sheets 13 and 14. One plate, here shown as the lower plate 14, is in electrical wiring connection with the battery 12, and the voltage field between the two plates 13 and 14 changes when the distance between the plates changes.

The sealing material 5 or rubber-elastic body is in contact with the upper surface 18 of the capacitive pressure sensor 8, here the upper surface 18 of the first plate 13. Plate 13 can in principle be replaced by a coating on the free upper surface part of the rubber-elastic body 5.1 in the bottom of the cavity 7.

The cavity 7 is closed against the foundation 31 with a stopper 19. The cavity 7 is a cylindrical space, e.g. a circular cylindrical space if the radial walls 22 comprise a thread 23. The sensor unit 6 is placed in a circular or tubular sleeve 24 and this sleeve 24 is held in place in the cavity 7 by a stopper 19 with a thread. In the realisation of the invention shown in FIGS. 1-4, the stopper 19 has an external thread 25, which is designed to be screwed into the internal thread 23 of the cylindrical space. An O-ring 29 helps to ensure a tight fit, and the sensor unit 6 is protected against bacteria, etc. penetrating into the cavity 7.

The sensor unit 6 is suitable for use in the machine foot 1, where the machine foot 1 is used for levelling a machine which is borne by a number of machine feet 1. Here a signal is sent through each antenna containing information about the current machine foot load, and a difference in weight or load difference between the supporting feet of the machine can be detected by an external receiver device. Next, the external recipient unit makes a correction of the machine feet levelling, such that, for instance, each machine foot and actuator is linked, so that the spacer's length is adjustable in such a way that the sensor unit 6 on the measured machine feet finally shows the same weight or load.

The sealing mass of the mounting material 5 has an outer surface 21 which is complementary in shape with the inner surface 20 of the cap 4.

The sealing material 5 consists of an appropriate FDA-approved NBR rubber material.

FIGS. 6, 7, 8, 9 and 11 display an alternative location of the sensor 8, where an opening 34 in the cap's 4 upper side is used for installation of the sensor into the rubber-elastic body 5. In the description of this version, the same referral names are used for elements which perform the same function as in the previously described version, even if their design may be slightly different. In principle, it is the same sensor type, where a free upper surface part of the rubber-elastic body 5 is allowed to move in response to the pressure-condition of the body 5, which in turn is the result of the load with the weight of a part of a machine. Then the size of the movement is measured with an immobile part as the reference. Here too, the capacitive sensor is one of many types of sensors which could be used for the detection of the pressure-condition inside the rubber-elastic body. In its simplest form, the sensor is thus just a dial indicator 35, as shown in FIG. 10, which is mounted on the cap 4 and which records the bulge of the free surface 5.1 compared to the relatively rigid cap through an opening 34 of the cap when the machine foot is loaded. This dial indicator 35 can be read manually, and the result is used by an operator to ensure that the machine feet are each equally loaded by the machine which, for example, is mounted on them. The signal issued occurs in the form of the position of the dial in relation to the measurement scale, which is simple and straightforward to read visually.

FIGS. 6, 7, 8, 9 and 11 illustrate the invention's approach to establishing a signal which indicates the pressure-condition in a machine foot, as the fixed surface of the rubber-elastic body. Here also a load of the machine foot 1 is transferred from a rigid cap 4 to a substrate 31 through the rubber-elastic body 5. The body 5 is pressure set by increasing the load on the top part 3, and the distance between a free upper surface part 5.1 of the rubber-elastic body 5 and an immobile part 14.1 is determined by an electro-mechanical transducer 6 establishing an electrical signal corresponding to the distance. This signal can be used as a measurement for the rubber-elastic body pressure-condition and thus the machine foot's load.

The top part 3 acts as a spacer between a machine (not shown) and a load distributor and the under part 2.

The rubber-elastic body 5 serves as the sealing material, since it is impervious to moisture and many other harmful substances to which a machine foot underneath the under part and load distributor 3 will necessarily be exposed. The rubber-elastic body 5 or the sealing material are vulcanised directly onto the cap 4, creating an area or an opening 34 in the surface of the cap 4, so that the rubber-elastic body 5 has a free surface 5.1 in an area within the opening 34 (see FIG. 11). The surface 5.1 is free to receive a sensor element, e.g. the tip of a dial indicator 35, or an electromechanical sensor which can convert either the free surface's motion, or the pressure which the surface will have an impact on the environment with, if the surface 5.1 is maintained in the same or approximately the same position when there is no load. What is special about the proposed pressure or distance measurement is that the measured value is omnidirectional, understood in the sense that the four surfaces can be established in relation to any direction, so that the value is an expression of the hydrostatic pressure in the rubber-elastic body, assuming that the pressure in the body is distributed evenly and assuming that the rubber body's e-modulus is low compared to the pressure.

Figure 9:
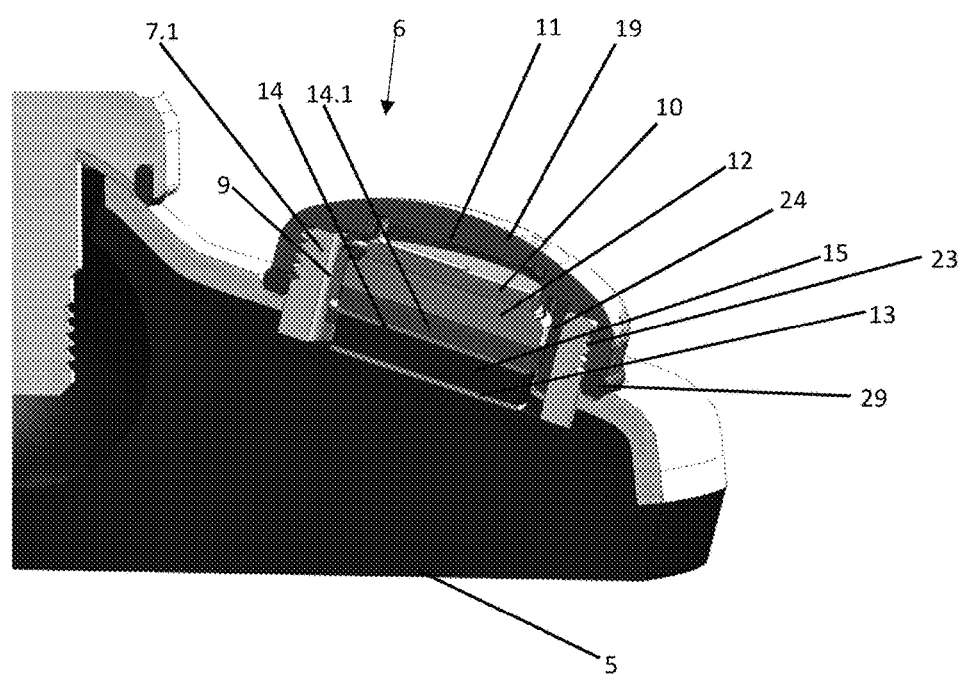
FIG. 9 shows a section and 3D rendering of the sensing device shown in FIG. 8.
Figure 10:
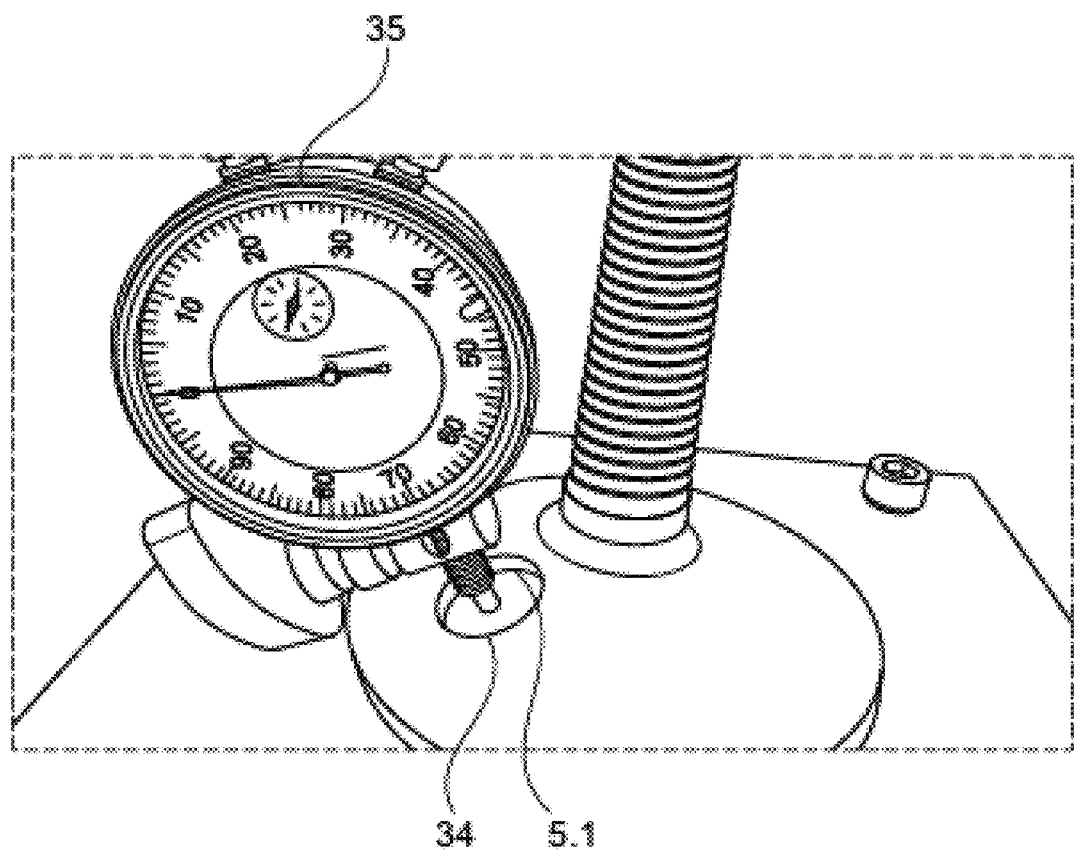
FIG. 10 shows a photograph of a sensor unit in the form of a dial indicator.
Figure 11:
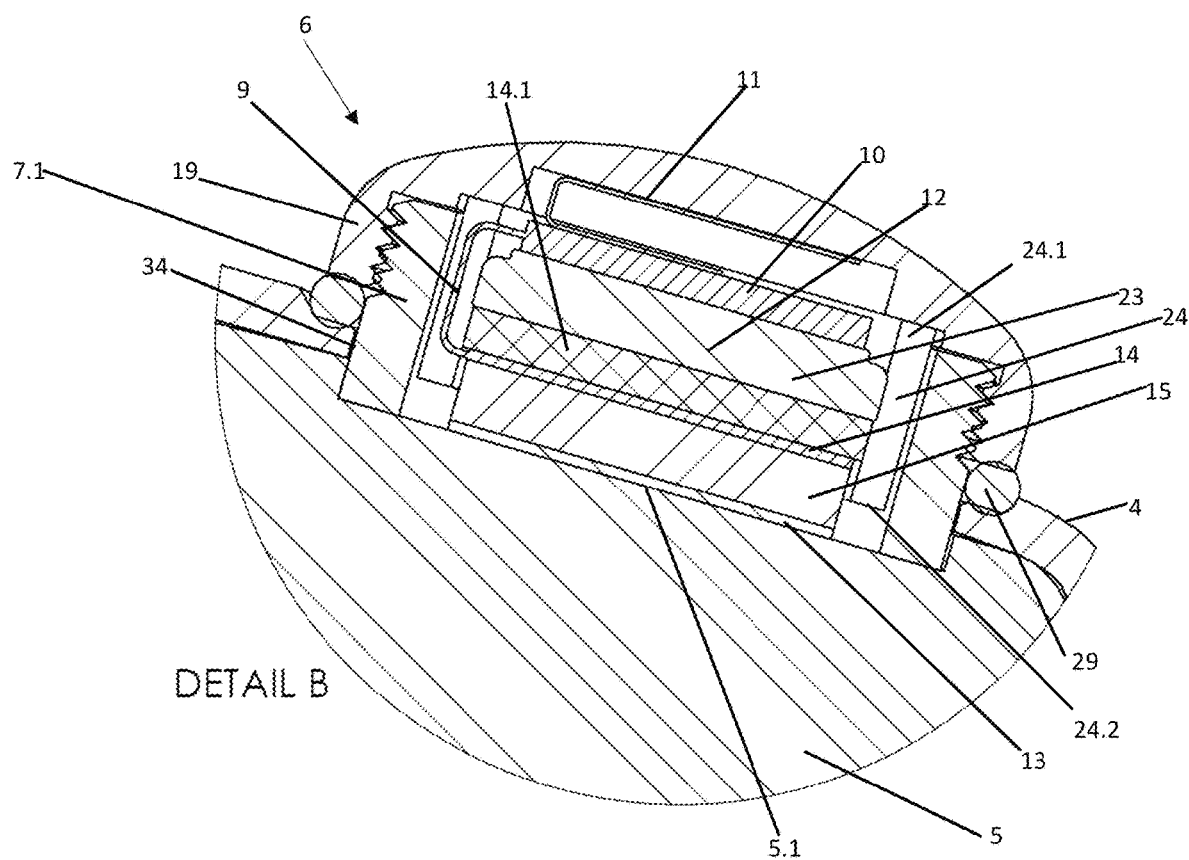
FIG. 11 is a magnified sample from FIG. 7 marked "detail B".

Depending on the version, the distance between the free upper surface part 5.1 of the rubber-elastic body 5 and immobile part 14.1 is determined by a measurement of the distance-related electrical capacity between a first plate 13 on the rubber-elastic body free surface and a second plate 14 on the immobile part as illustrated in FIG. 11 and FIG. 9.

As indicated, it is also possible to determine the pressure without letting the surface part 5.1 move more than an infinitesimal distance, as will be the case if a piezoelectric element is embedded between the first and second surfaces. But also in this case, the size of the piezoelement's compression will depend directly on the signal size issued, so that, although the movement here is very small, there will still be a measurement of a distance change which is a direct indicator of the pressure-condition of the rubber-elastic body.

In FIGS. 11 and 9, this is illustrated by the section showing a cut-through an electro-mechanical transducer 6 which is suitable for carrying out such a measurement. The first plate 13 is set against the rubber-elastic body's free surface within the opening in the cap 4. Plate 13 can be relatively rigid or flexible and for example have a conductive surface on its deviation from the rubber-elastic body's facing surface. The second plate 14 is at a distance from the first plate 13 and is connected in the sensor configuration to the electrical circuit via a cable 9 or other electrical wiring connection. This cable or connection 9 is connected to one pole of the battery through the electrical circuit 10. The circuit 10 is well-formed as a printed circuit on a rigid or flexible medium. Between the first plate 13 and the second plate 14 is a space which is filled in by a dielectric medium 15 or dielectric. The dielectric 15 may appropriately be formed of silicon or some other very ductile polymer, possibly in a foamed state. It may also be ordinary atmospheric air or a fluid-filled balloon. In any case, the dielectric medium 15 has a small or no e-modulus, so that the other plate's 14 movement against the first plate 13 triggers a signal and either allows itself to be compressed or frozen out without obstacle in a rim cavity provided for the purpose by the dielectric medium 15. If the dielectric medium has an e-modulus, it will be several orders of magnitude under the e-modulus for the rubber-elastic body 5, so that the movement of the free surface is not hindered by the presence of the dielectric medium.

In FIG. 11 it can be seen that the tubular sleeve 24 is enclosed in a pipe 7.1 which here has the same function as the cavity 7 in the method according to FIGS. 2-5. The cavity 7 or pipe 7.1 has a diameter that is slightly larger than the diameter of the tubular sleeve 24. In the example of the invention according to FIG. 11 and FIG. 4, the cavity 7, pipe 7.1 and sleeve 24 are all circular-cylindrical, but square profiles or other pipe profiles can in principle be used.

The sleeve 24 comprises the immobile part 14.1 as seen from FIG. 11, and here this part is designed as a plate that sits perpendicular to the longitudinal axis of the sleeve 24. The plate can be injection-moulded in plastic consistent with the cylindrical part of the sleeve. As also shown in FIG. 11, the cylindrical part is in both sides crossed lengthwise by a slit, as indicated by the plate or immobile part 14.1 being shown as an interface, where the cylindrical part is seen not to be intersected in both sides. On the left side of the cylinder-shaped part, the slot gives space to the cable 9 between the plate 14 and the PCB 10. In the right side, the slot can be used to secure the sleeve against rotation, when the stopper 19 is rotated to secure a fixed pressure on the dielectric part 15.

As shown in FIG. 11, the pipe is completed outside the cap 4 with a thread, and a stopper 19 is mounted on it. When the stopper is screwed down to the cap, an inner part of it at the same time is pressed downwards against the rubber sleeve's 24 tubular elastic body's free surface. In doing so, the dielectric element 15 is under pressure, and, since it is formed of a fluid or a material with very low e-modulus, the pressure-condition leads to the spacing between the first and second plate being reduced. This spacing change is used to calibrate the electromechanical sensor, so that a value for the u-loaded mode will be exported when the stopper is screwed firmly to the pipe with an adequate torque and it is certain that the dielectric element is pressurised. This ensures that there is no gap where the dielectric body does not completely fill the distance between the two plates, and which therefore, on an initial loading, cannot be read as a certain value for the distance between the plates, due to the change of the machine foot's load.

A similar stopper 19 is shown in FIG. 4, but here it is screwed in a single thread 23 which is either trimmed in the rubber-elastic body or trimmed in a pipe 22 which is embedded in the rubber-elastic body and opens here in its end. For both versions shown in FIG. 4 and FIG. 11 of the invention, in addition to or as a substitute for this calibration via the prop, there can also be electronic calibration with a number of load steps and associated recording of the measuring signal from the electrostatic sensor. This can be done in connection with the production of the machine foot and/or it can take place with the end user. In relation to this, it is appropriate to screw the stopper in with a predetermined torque, or with a predetermined number of rotations between the stopper and the corresponding thread.

REFERENCE NUMBER 1 machine foot and levelling block
2 load switcher and under part
3 spacer and top part
4 cap
5 rubber-elastic body and sealing material
5.1 free upper surface part of rubber-elastic body
6 electro-mechanical transducer and sensor unit
7 cavity
7.1 enclosing pipe
8 capacitive pressure sensor
9 wiring-electrical connection with a battery
10 electronic calculation device in the form of a printed circuit
11 antenna
12 battery
13 first flat plate
14 second flat plate
14.1 immobile part
15 dielectric
18 upper surface of the capacitive pressure sensor.
19 prop
20 inner surface of the cap facing the sealing material
21 outer surface of the sealing material
22 cavity or pipe with radially pointing walls
23 cavity or pipe thread
24 tubular or circular sleeve
24.1 tubular sleeve's end part
24.2 tubular sleeve's second end part
25 outer thread
27 spindle
28 thread screening
29 O-ring
31 base and foundation
33 exposed area
34 opening in the cap
35 dial indicator

The invention claimed is:

1. A method for the establishment of a signal which is indicative of the pressure-condition in a rubber-elastic body of a machine foot, comprising:
transferring a load of the machine foot from a rigid cap to a substrate through the rubber-elastic body, wherein the rubber-elastic body is pressurized by the load, such that the distance between a free upper surface part of the rubber-elastic body and an immobile part of an electro-mechanical transducer is determined by the electro-mechanical transducer, and
establishing, by the electro-mechanical transducer, an electrical signal corresponding to the distance, wherein the signal is used as a measure of the pressure-condition of the rubber-elastic body and thus the load of the machine foot,
wherein the distance between the free upper surface part of the rubber-elastic body and the immobile part is determined by a measurement of the distance-related electrical capacity between a first plate at the free upper surface part of the rubber-elastic body and a second plate at the immobile part,
wherein prior to a load of the machine foot, the immobile part is calibrated by adjusting a stopper in threaded engagement with an enveloping pipe provided outside of the tubular sleeve, which stopper, directly or indirectly, is configured to move the immobile part toward or away from the free upper surface part of the rubber-elastic body for the establishment of a selected distance between the free surface of the rubber-elastic body and the immobile part.

2. The method according to claim 1, wherein the space between the first plate and the second plate is filled by a dielectric.

3. The method according to claim 1, wherein the immobile part during measurement is kept in a tubular sleeve at a predetermined distance from an end part of the tubular sleeve adjacent to the free upper surface part of the rubber-elastic body.

4. A machine foot, comprising:
an adjustable spacer having a first end configured to be coupled to a machine, and a second end configured to be coupled to a load distributer, wherein the load distributor comprises a load-carrying cap and a rubber-elastic body; and
an electro-mechanical transducer having a mechanical part and an electrical part, and wherein the electro-mechanical transducer is embedded in the rubber-elastic body and arranged to provide an electrical signal for indication of the a pressure condition;
wherein the load-carrying cap comprises an upper side having a central area and a lower side adjacent to the rubber-elastic body, wherein the central area on the upper side of the load-carrying cap is configured to receive an entire load from the spacer, and configured to transfer the load through to the entire lower side to the rubber-elastic body, wherein the rubber-elastic body is configured to transfer the load to a substrate;
wherein the electro-mechanical transducer comprises a tubular sleeve having an immobile part disposed therein;
wherein the mechanical part of the electro-mechanical transducer is designed to convert a given internal overpressure in the rubber-elastic body to a corresponding movement between a free surface of the rubber-elastic body and the immobile part of the electro-mechanical transducer;
wherein the electrical part of the electro-mechanical transducer is designed to deliver an electrical signal corresponding to the size of the distance between the free surface and the immobile part; and
wherein the tubular sleeve further comprises a detachable stopper, wherein the stopper is mounted on the second end part, wherein the stopper is mounted at either the exterior or interior thread of a pipe section which encloses the tubular body, and wherein adjustment of the stopper in threaded engagement with the pipe section adjusts the distance between the free surface of the rubber-elastic body and the immobile part.

5. The machine foot according to claim 4, wherein the tubular sleeve comprises a first end part bordering the rubber-elastic body, and wherein the free surface of the rubber-elastic body faces the first end part of the tubular sleeve, and wherein a second end part of the tubular sleeve is accessible from a region exterior to load-carrying cap.

6. The machine foot according to claim 5, wherein the tubular sleeve is mounted in an opening in the load-carrying cap.

7. The machine foot according to claim 5, wherein the tubular sleeve is placed in the rubber-elastic body's limit towards the substrate.

8. The machine foot according to claim 4, wherein the tubular sleeve further comprises a battery, an electronic calculation device, an antenna and a device adapted for radio communication.

\* \* \* \* \*